United States Patent
Zhao et al.

(10) Patent No.: US 12,430,229 B2
(45) Date of Patent: Sep. 30, 2025

(54) INTELLIGENT WAY TO SELECT REGRESSION TEST CASES IN SYSTEM TEST

(71) Applicant: Dell Products L.P., Round Rock, TX (US)

(72) Inventors: Chaojun Zhao, Chengdu (CN); Weilan Pu, Chengdu (CN); Shuangshuang Liang, Zunyi (CN); Yang Zhang, Chengdu (CN); Jingyi Wang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 248 days.

(21) Appl. No.: 18/200,015

(22) Filed: May 22, 2023

(65) Prior Publication Data

US 2024/0241813 A1    Jul. 18, 2024

(30) Foreign Application Priority Data

Jan. 17, 2023 (CN) .......................... 202310081662.5

(51) Int. Cl.
*G06F 11/3668* (2025.01)
*G06F 11/3604* (2025.01)

(52) U.S. Cl.
CPC ...... *G06F 11/3676* (2013.01); *G06F 11/3616* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 6,173,440 B1* | 1/2001 | Darty | G06F 11/3608 714/E11.21 |
| 2004/0015866 A1* | 1/2004 | Estep | G06F 11/3684 717/124 |
| 2006/0168565 A1* | 7/2006 | Gamma | G06F 11/3688 717/122 |
| 2008/0046791 A1* | 2/2008 | Bicheno | G06F 11/3688 714/742 |

(Continued)

OTHER PUBLICATIONS

A. Marchetto, G. Scanniello and A. Susi, "Combining Code and Requirements Coverage with Execution Cost for Test Suite Reduction," in IEEE Transactions on Software Engineering, vol. 45, No. 4, pp. 363-390, Apr. 1, 2019. (Year: 2019).*

*Primary Examiner* — Andrew M. Lyons
(74) *Attorney, Agent, or Firm* — Krishnendu Gupta; Lesley Leonessa (57) ABSTRACT

Methods, system, and non-transitory processor-readable storage medium for a test selection system are provided herein. An example method includes selecting, by a test selection system, a regression test case from a plurality of regression test cases in a software testing lifecycle system. The test selection system determines a product release weight associated with the regression test case, where the product release weight incorporates new features associated with a product release. The test selection system obtains a regression test case value for the regression test case by applying the product release weight. The test selection system selects the regression test case for use in regression testing for the product release, based on the regression test case value and executes the regression test case on a system.

17 Claims, 6 Drawing Sheets

(56) References Cited

U.S. PATENT DOCUMENTS

| | | | |
|---|---|---|---|
| 2016/0162392 A1* | 6/2016 | Hu | G06F 11/3688 714/38.1 |
| 2018/0189055 A1* | 7/2018 | Dasgupta | G06F 11/3692 |

* cited by examiner

| Algorithm 1: | Knapsack Problem |
|---|---|
| Input: | W – the knapsack capacity |
| Input: | wt – the array to store weight for each item |
| Input: | val – the array to store value for each item |
| Input: | n – the length of items |
| 1: | Initialize array K[0..n, 0..W] with zeros; |
| 2: | For i from 0 to n do: |
| 3: | For w from 0 to W do: |
| 4: | If i==0 or w==0: |
| 5: | K[i][w] = 0 |
| 6: | Else If wt[i - 1] <= w then: |
| 7: | K[i, j] = max(val[i - 1] + K[i - 1][w - wt[i - 1]], K[i - 1][w]) |
| 8: | Else: |
| 9: | K[i][w] = K[i - 1][w] |
| Output: | K[n][W] – the optimal value |

FIG. 3

| Algorithm 2: | Traceback the Selected Items |
|---|---|
| Input: | K – the array to store middle values of knapsack problem |
| Input: | W – the knapsack capacity |
| Input: | wt – the array to store weight for each item |
| Input: | val – the array to store value for each item |
| Input | n – the length of items |
| 1: | Initialize res = K[n][W], w = W |
| 2: | Initialize selected_items = [] |
| 3: | For i from n to 0 do: |
| 4: |   If res <= 0: |
| 5: |     Break |
| 6: |   If res == K[i - 1][w]: |
| 7: |     Continue |
| 8: |   Else: |
| 9: |     selected_items.append(i - 1) |
| 10: |     res = res -val[i - 1] |
| 11: |     w = w – wt[i - 1] |
| Output: | selected_items – the index list of the selected items |

INTELLIGENT WAY TO SELECT REGRESSION TEST CASES IN SYSTEM TEST

FIELD

The field relates generally to optimizing selection of regression tests, and more particularly to optimizing selection of regression tests in information processing systems.

BACKGROUND

System test is a critical part of the pre-release quality engineering activities for information processing systems. There are two important parts of the system test phase; new feature tests and regression tests. There may be thousands of system regression test cases for complicated information processing systems, such as storage products.

SUMMARY

Illustrative embodiments provide techniques for implementing a test selection system in a storage system. For example, illustrative embodiments select a regression test case from a plurality of regression test cases in a software testing lifecycle system. A test selection system determines a product release weight associated with the regression test case, where the product release weight incorporates new features associated with a product release. The test selection system obtains a regression test case value for the regression test case by applying the product release weight. The test selection system selects the regression test case for use in regression testing for the product release, based on the regression test case value and executes the regression test case on a system. Other types of processing devices can be used in other embodiments.

These and other illustrative embodiments include, without limitation, apparatus, systems, methods and processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a test selection system, which technique may be used to provide, among other things regression test selection optimization by selecting a regression test case from a plurality of regression test cases in a software testing lifecycle system. A test selection system determines a product release weight associated with the regression test case, where the product release weight incorporates new features associated with a product release. The test selection system obtains a regression test case value for the regression test case by applying the product release weight. The test selection system selects the regression test case for use in regression testing for the product release, based on the regression test case value and executes the regression test case on a system.

The system test phase of the pre-release quality engineering activities for information processing systems may comprise thousands of regression test cases. The regression test cases may be treated equally, but ten percent of the regression test cases may identify ninety percent of the issues reported, or twenty percent of the regression test cases may identify eighty percent of the issues reported. The regression test cases that can more readily identify issues should have a greater weight for providing test coverage for the product being tested.

Typically, regression tests are selected based on new features in new releases of a product, and not based on product defects. The product defects that are tested in new releases may also introduce regression issues.

Conventional technologies do not provide a way to evaluate the value and weight of regression test cases. Engineers may have difficulty selecting the appropriate regression test cases, especially when they are not the owner of the regression test case. The hardware resources and human resources may change from product release to product release, and may be reduced. Teams may not have the bandwidth to rerun the full set of regression test cases for new product releases. Conventional technologies do not provide a way to select the best regression test cases to adequately provide regression testing coverage of the new features in the new product releases, especially when resources are limited. Conventional technologies do not provide a way to establish a regression test case's value based on the issues the regression test case identifies, and update that value with each product release. Conventional technologies do not identify an optimal subset of regression test cases for each product release where the subset of regression test cases is targeted based on the code changes (i.e., new features and defects addressed).

By contrast, in at least some implementations in accordance with the current technique as described herein, regression test selection is optimized by selecting a regression test case from a plurality of regression test cases in a software testing lifecycle system. A test selection system determines a product release weight associated with the regression test case, where the product release weight incorporates new features associated with a product release. The test selection system obtains a regression test case value for the regression test case by applying the product release weight. The test selection system selects the regression test case for use in regression testing for the product release, based on the regression test case value and executes the regression test case on a system.

Thus, a goal of the current technique is to provide a method and a system for providing a test selection system that can identify an optimal subset of regression test cases for each product release where the subset of regression test cases is targeted based on the code changes (i.e., new features and defects addressed). Another goal is to provide a way to evaluate the value and weight of regression test cases. Another goal is to provide a way to establish a regression test case's value based on the issues the regression test case identifies, and update that value with each product release. Yet another goal is to provide a way to select the best regression test cases to adequately provide regression testing coverage of the new features in the new product releases.

In at least some implementations in accordance with the current technique described herein, the use of a test selection system can provide one or more of the following advantages: providing a way to evaluate the value and weight of regression test cases, providing a way to select the best regression test cases to adequately provide regression testing coverage of the new features in the new product releases, providing a way to establish a regression test case's value based on the issues the regression test case identifies, and update that value with each product release, and identifying an optimal subset of regression test cases for each product release where the subset of regression test cases is targeted based on the code changes (i.e., new features and defects addressed).

In contrast to conventional technologies, in at least some implementations in accordance with the current technique as described herein, regression test selection is optimized by selecting a regression test case from a plurality of regression test cases in a software testing lifecycle system. A test selection system determines a product release weight associated with the regression test case, where the product release weight incorporates new features associated with a product release. The test selection system obtains a regression test case value for the regression test case by applying the product release weight. The test selection system selects the regression test case for use in regression testing for the product release, based on the regression test case value and executes the regression test case on a system.

In an example embodiment of the current technique, the test selection system determines a respective regression test case value for each regression test case in the plurality of regression test cases, and selects a subset of the plurality of regression test cases for use in regression testing for the product release, where the subset covers regression testing for at least a portion of code changes in the product release.

In an example embodiment of the current technique, the test selection system repeats the steps of determining the product release weight, obtaining the regression test case value, and selecting the regression test case for the next product release using regression test case values from at least the product release and the previous product release.

In an example embodiment of the current technique, the test selection system determines a major area score.

In an example embodiment of the current technique, the test selection system identifies major areas associated with a product, and identifies major areas test coverage of the regression test case. The test selection system assigns a base score to each major area tested by the regression test case, and then updates the base score of each major area based on results of the regression test case executing on a previous product release.

In an example embodiment of the current technique, the test selection system the test selection system determines the regression test case identified defects during execution of the regression test on the previous product release. The test selection system updates the base score of each major area based on a prior release defect major area weight associated with the defects identified during the execution on the previous product release.

In an example embodiment of the current technique, the test selection system determines a code change impact between the product release and a previous product release.

In an example embodiment of the current technique, the test selection system determines a new feature weight using a default new feature weight and a new feature primary weight.

In an example embodiment of the current technique, the test selection system determines a new feature size and business ranking for each new feature in the product release, and determines a default new feature weight using the business ranking.

In an example embodiment of the current technique, the test selection system defines at least one primary major area and at least one secondary major area associated with a new feature for each new feature in the product release. The test selection system calculates a new feature primary weight using the default new feature weight, for at least one primary major area, and assigns the default new feature weight to at least one secondary major area.

In an example embodiment of the current technique, the test selection system calculates the new feature primary weight using the default new feature weight and the new feature size.

In an example embodiment of the current technique, the test selection system averages a plurality of business rankings associated with all new features in the product release to determine the default new feature weight.

In an example embodiment of the current technique, the test selection system, for each major area impacted by the product release, sums a plurality of new feature primary weights for a plurality of new features to obtain a major area weight for one major area.

In an example embodiment of the current technique, the test selection system identifies a defect major area weight for each defect addressed in the product release.

In an example embodiment of the current technique, the test selection system determines the defect major area weight using at least one of a defect priority, a uniqueness of the defect, and a defect status of whether the defect is a regression issue or deferral issue.

In an example embodiment of the current technique, the test selection system combines a new feature weight and a defect major area weight for each defect to obtain the product release weight associated with the regression test case.

In an example embodiment of the current technique, the test selection system uses the regression test case value and the test case weight to determine the regression test case covers a scope of code changes in the product release.

In an example embodiment of the current technique, the test selection system determines a test case weight, where the test case weight comprises at least one of a duration associated with the execution of the regression test case on a previous product release, at least one hardware requirement associated with the regression test case, and the number of times the regression test case was executed on the previous product release.

Figure 1:
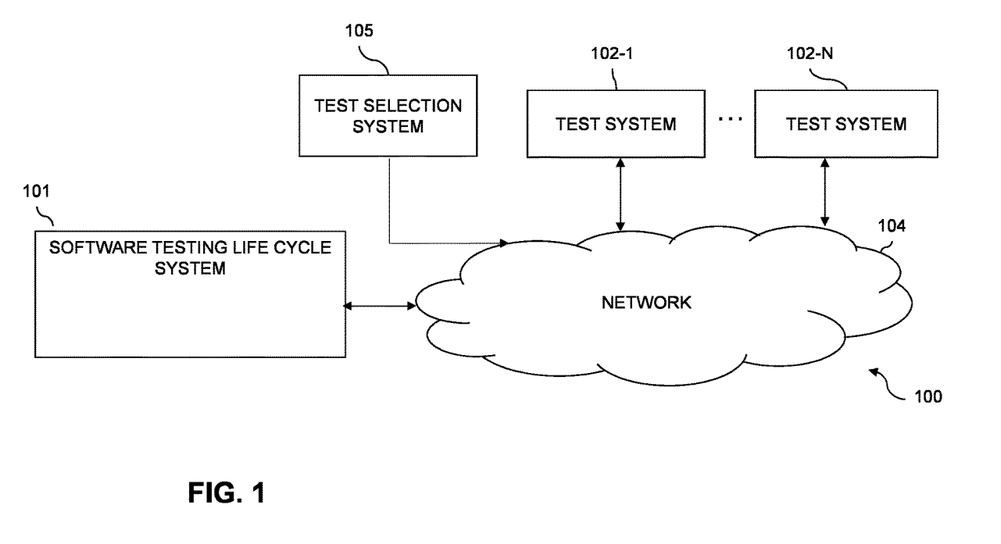
FIG. 1 shows an information processing system including a test selection system in an illustrative embodiment.

FIG. 1 shows a computer network (also referred to herein as an information processing system) 100 configured in accordance with an illustrative embodiment. The computer network 100 comprises a software testing life cycle system 101, test selection system 105, and test systems 102-N. The software testing life cycle system 101, test selection system 105, and test systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a test selection system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the test systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The test systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the test selection system 105 are one or more input-output devices, which illustratively comprise keyboards, displays or other types of input-output devices in any combination. Such input-output devices can be used, for example, to support one or more user interfaces to the test selection system 105, as well as to support communication between the test selection system 105 and other related systems and devices not explicitly shown. For example, a dashboard may be provided for a user to view a progression of the execution of the test selection system 105. One or more input-output devices may also be associated with any of the test systems 102-N.

Additionally, the test selection system 105 in the FIG. 1 embodiment is assumed to be implemented using at least one processing device. Each such processing device generally comprises at least one processor and an associated memory, and implements one or more functional modules for controlling certain features of the test selection system 105.

More particularly, the test selection system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the test selection system 105 to communicate over the network 104 with the software testing life cycle system 101, and test systems 102-N and illustratively comprises one or more conventional transceivers.

A test selection system 105 may be implemented at least in part in the form of software that is stored in memory and executed by a processor, and may reside in any processing device.

The test selection system 105 may be a standalone plugin that may be included within a processing device.

It is to be understood that the particular set of elements shown in FIG. 1 for test selection system 105 involving the software testing life cycle system 101, and test systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the test selection system 105 can be on and/or part of the same processing platform.

An exemplary process of test selection system 105 in computer network 100 will be described in more detail with reference to, for example, the flow diagram of FIG. 2.

Figure 2:
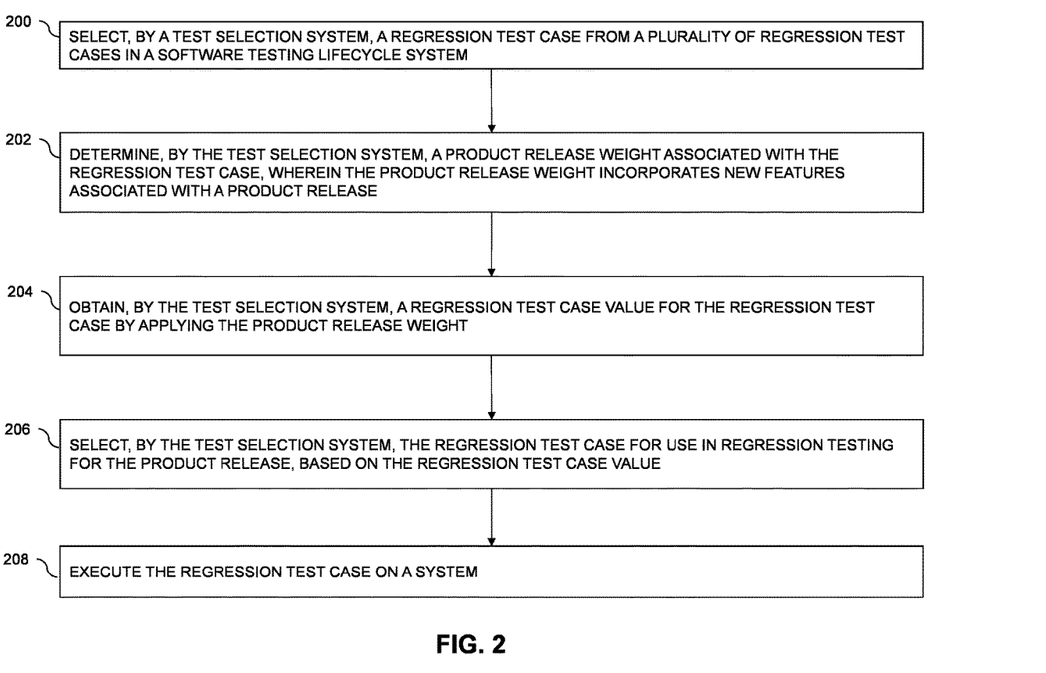
FIG. 2 shows a flow diagram of a process for a test selection system in an illustrative embodiment.

FIG. 2 is a flow diagram of a process for execution of the test selection system 105 in an illustrative embodiment. It is to be understood that this particular process is only an example, and additional or alternative processes can be carried out in other embodiments.

At 200, the test selection system 105 selects a regression test case from a plurality of regression test cases in a software testing lifecycle system. In an example embodiment, the test selection system 105 will individually select each regression test case from the plurality of regression test cases to evaluate each regression test case to find the optimal subset of regression test cases for each product release.

At 202, the test selection system 105 determines a product release weight associated with the regression test case, where the product release weight incorporates new features associated with a product release. In an example embodiment, the test selection system 105 determines a major area score. In the development phase of a product release, the major areas are defined for code management, features design and bug fixes. The various customer scenarios are combined with different sets of the product major areas.

Regression test cases are designed and reviewed, and then tagged with one or more major areas based on the purpose of the regression test case. In an example embodiment, the regression tests may be tagged in a matrix or tabular format. In an example embodiment, the test selection system 105 identifies major areas associated with a product, and major areas test coverage of the regression test case. The test selection system 105 then assigns a base score to each major area tested by the regression test case. For example, each regression test case "TC" will be associated with major areas "MA" as illustrated in the table below (where "1" indicates the regression test case TC #provides major area test coverage for the major area MA #):

| TC | MA1 | MA2 | MA3 | MA4 | MA5 | MA6 |
|---|---|---|---|---|---|---|
| TC1 | 1 | 0 | 1 | 0 | 0 | 1 |
| TC2 | 1 | 1 | 1 | 0 | 0 | 0 |
| TC3 | 0 | 1 | 0 | 0 | 0 | 0 |
| TC4 | 0 | 0 | 0 | 1 | 1 | 0 |
| TC5 | 1 | 0 | 0 | 0 | 1 | 1 |
| TC6 | 1 | 0 | 1 | 1 | 1 | 1 |
| TC7 | 0 | 1 | 0 | 1 | 1 | 0 |
| TC8 | 0 | 1 | 1 | 0 | 0 | 0 |
| TC9 | 0 | 0 | 0 | 1 | 0 | 1 |
| TC10 | 1 | 0 | 1 | 0 | 1 | 1 |
| * | * | * | * | * | * | * |
| * | * | * | * | * | * | * |
| * | * | * | * | * | * | * |
| TC300 | 1 | 0 | 1 | 0 | 0 | 1 |

In an example embodiment, the test selection system 105 then updates the base score of each major area based on results of the regression test case executing on a previous product release. In an example embodiment, the test selection system 105 obtains the regression test case results from the previous product release. A regression test case result table is created for each test cycle, where a test cycle is the duration in which a particular regression test case was executed once. In an example embodiment, a test cycle may be 1 week, 2 weeks, etc. An example regression test case result table is illustrated below, where "P" indicates a defect priority, where the higher the "P #", the higher the defect priority:

| TC | MA1 | MA2 | MA3 | MA4 | MA5 | MA6 | Linked Defect 1 | Linked Defect 2 |
|---|---|---|---|---|---|---|---|---|
| TC1 | 1 | 0 | 1 | 0 | 0 | 1 | | |
| TC2 | 1 | 1 | 1 | 0 | 0 | 0 | | |
| TC3 | 0 | 1 | 0 | 0 | 0 | 0 | | |
| TC4 | 0 | 0 | 0 | 1 | 1 | 0 | | |
| TC5 | 1 | 0 | 0 | 0 | 1 | 1 | | |
| TC6 | 1 | 0 | 1 | 1 | 1 | 1 | | |
| TC7 | 0 | 1 | 0 | 1 | 1 | 0 | P1 (MA2) | P2 (MA5) |
| TC8 | 0 | 1 | 1 | 0 | 0 | 0 | | |
| TC9 | 0 | 0 | 0 | 1 | 0 | 1 | | |
| TC10 | 1 | 0 | 1 | 0 | 1 | 1 | P2 (MA5) | |
| * | * | * | * | * | * | * | | |
| * | * | * | * | * | * | * | | |
| * | * | * | * | * | * | * | | |
| TC300 | 1 | 0 | 1 | 0 | 0 | 1 | | |

In an example embodiment, the test selection system 105 updates the base score of each major area based on a prior release defect major area weight associated with the defects identified during the execution on the previous product release.

In an example embodiment, the test selection system 105 updates the base score with different weights based on the defects identified when the regression test cases were executed on a previous product release using the following formula:

$$TCS_{ij} = TCS_{ij} \times W_1 \times W_2 \times \ldots \times W_n$$

In the above formula, $TCS_{ij}$ is the score of the regression test case for the major area, "i" is the major area, "j" is the regression test case, and $W_K$ is the weight of the defect "k", where "k" is the value assigned by the defect priority, "P".

An example updated regression test case result table is illustrated below:

| TC | MA1 | MA2 | MA3 | MA4 | MA5 | MA6 |
|---|---|---|---|---|---|---|
| TC1 | 1 | 0 | 1 | 0 | 0 | 1 |
| TC2 | 1 | 1 | 1 | 0 | 0 | 0 |
| TC3 | 0 | 1 | 0 | 0 | 0 | 0 |
| TC4 | 0 | 0 | 0 | 1 | 1 | 0 |
| TC5 | 1 | 0 | 0 | 0 | 1 | 1 |
| TC6 | 1 | 0 | 1 | 1 | 1 | 1 |
| TC7 | 0 | 1.5 | 0 | 1 | 1.1 | 0 |
| TC8 | 0 | 1 | 1 | 0 | 0 | 0 |
| TC9 | 0 | 0 | 0 | 1 | 0 | 1 |
| TC10 | 1 | 0 | 1 | 0 | 1.1 | 1 |
| * | * | * | * | * | * | * |
| * | * | * | * | * | * | * |
| * | * | * | * | * | * | * |
| TC300 | 1 | 0 | 1 | 0 | 0 | 1 |
| Total | 202 | 185 | 150 | 84 | 126 | 145 |

In an example embodiment, this process is repeated for each test cycle to obtain the overall major area score for each regression test. In an example embodiment, the regression tests in the plurality of regression tests are executed on previous product releases, and those major area scores are used to determine an optimal subset of regression tests that are most efficient to test the product release (i.e., the current product release).

In an example embodiment, the test selection system 105 determines a code change impact between the product release and a previous product release. The test selection system 105 determines the code change impact by determining a new feature weight using a default new feature weight and a new feature primary weight.

In an example embodiment, the test selection system 105 determines a new feature size and business ranking for each new feature in the product release, and determines a default new feature weight using the business ranking. In an example embodiment, the feature size may be an estimation of how big the feature is, and/or how many lines of code are required for this feature. In an example embodiment, the business ranking may be the importance of the feature. The business ranking may be decided by a team, determined by the market, or the customers. In an example embodiment, the test selection system 105 averages a plurality of business rankings associated with all new features in the product release to determine the default new feature weight. In an example embodiment, the default new feature weight, "$FMAW_d$" is assigned the average business rank.

In an example embodiment, the test selection system 105 defines at least one primary major area and at least one secondary major area associated with a new feature for each new feature in the product release. An example of this is illustrated below:

| New Feature | Size | Business Ranking | Primary Impacted MA | Secondary Impacted MA |
|---|---|---|---|---|
| NF1 | XL | 155 | MA1 | n/a |
| NF2 | L | 170 | MA3 | MA7 |
| NF3 | M | 167 | MA2 | MA9 |
| NF4 | S | 172 | MA1 | n/a |
| * | * | * | * | * |
| * | * | * | * | * |
| * | * | * | * | * |
| NF20 | XS | 160 | MA1 | MA2 |

In an example embodiment, the test selection system 105 calculates a new feature primary weight using the default new feature weight, for at least one primary major area. In an example embodiment, the test selection system 105 calculates the new feature primary weight using the default new feature weight and the new feature size.

In an example embodiment, for each primary major area, the new feature primary weight $FMAW_i$ is calculated using the formula below:

$$FMAW_i = FSi \times \frac{FBi}{\overline{FB}} \times FMAW_d$$

In the above formula, FSi is the size of the new feature "i", $\overline{FB}$ is the average of business rankings associated with all new features, and FBi is the business ranking of the new feature "i". In an example embodiment, the new feature size FSi is assigned different values based on its engineering points.

In an example embodiment, the test selection system 105 assigns the default new feature weight to at least one secondary major area.

In an example embodiment, the test selection system 105, for each major area impacted by the product release, sums a plurality of new feature primary weights for a plurality of new features to obtain a major area weight for one major area.

In an example embodiment, the test selection system 105 identifies a defect major area weight for each defect addressed in the product release. The test selection system 105 determines the defect major area weight using at least one of a defect priority, a uniqueness of the defect, and a defect status of whether the defect is a regression issue or deferral issue. In an example embodiment, a deferral issue may be an issue from the last product release for which there is not a fix in the current product release, so the issue is deferred to a subsequent product release. A defect may be reported by a customer, may be a deferral issue, and/or may be reported in an internal test that is executed before regression tests are executed. The defect major area weight is calculated using the formula below:

$$\text{Weight}_{MA} = \begin{cases} \text{weight}_{priority} \times 3 & (\text{regression = yes}) \\ \text{weight}_{priority} & (\text{regression = no}) \end{cases}$$

Each major area is identified where a defect/bug is fixed in the product release. In the above formula, the priority indicates a defect priority, where the higher the value of the priority, the higher the defect priority. Each major area will get a total score as illustrated below:

| Defect | MA1 | MA2 | MA3 | MA4 | MA5 | MA6 |
|---|---|---|---|---|---|---|
| D1 | 0 | 0 | 1 | 0 | 0 | 0 |
| D2 | 3 | 0 | 0 | 0 | 0 | 0 |
| D3 | 0 | 1 | 0 | 0 | 0 | 0 |
| D4 | 0 | 0 | 1.1 | 0 | 0 | 0 |
| * | * | * | * | * | * | * |
| * | * | * | * | * | * | * |
| * | * | * | * | * | * | * |
| D500 | 2 | 0 | 0 | 0 | 0 | 0 |
| Total | Weight1 | Weight2 | Weight3 | Weight4 | Weight5 | Weight6 |

In an example embodiment, the test selection system 105 combines a new feature weight and a defect major area weight for each defect to obtain the product release weight associated with the regression test case. In an example embodiment, there may be large gaps between the new feature weight and the defect major area weight. In this example scenario, the test selection system 105 scales the weights before combining the values. The scaling may be performed as illustrated below:

$$x \text{ normalized} = (x - x \text{ minimum})/(x \text{ maximum} - x \text{ minimum})$$

In an example embodiment, the product release weight is the sum of the scaled defect score and the scaled feature score as illustrated in the table below:

| Major Area | Defect Weight | Feature Weight | Scaled Defect Weight | Scaled Feature Weight | Total MA Weight |
|---|---|---|---|---|---|
| MA1 | DWeight1 | FWeight1 | SDWeight1 | SFWeight1 | TMAWeight1 |
| MA2 | DWeight2 | FWeight2 | SDWeight2 | SFWeight2 | TMAWeight2 |
| MA3 | DWeight3 | FWeight3 | SDWeight3 | SFWeight3 | TMAWeight3 |
| * | * | * | * | * | * |
| * | * | * | * | * | * |
| * | * | * | * | * | * |
| * | * | * | * | * | * |
| MAn | DWeightn | FWeightn | SDWeightn | SFWeightn | TMAWeightn |

At 204, the test selection system 105 obtains a regression test case value for the regression test case by first applying the product release weight. In an example embodiment, the product release weight TMAWeightj is applied to each regression test case if the regression test case provides test coverage to the major area. The product release weight is applied to the regression test case value from the previous product release to obtain the product release weight for the (current) product release.

$$TCS_{ijProductRelease} = TCS_{ijPrevousProductRelease} \times TMAWeight_i$$

In an example embodiment, the regression test case value $TCV_i$ for the regression test case is the total score of the regression test case for the major area:

$$TCV_i = \sum_{j=0}^{n} TCS_{i,j}'$$

At 206, the test selection system 105 selects the regression test case for use in regression testing for the product release, based on the regression test case value. In an example embodiment, the test selection system 105 determines a respective regression test case value for each regression test case in the plurality of regression test cases. The test selection system 105 selects a subset of the plurality of regression test cases for use in regression testing for the product release, where the subset covers regression testing for at least a portion of code changes in the product release. In an example embodiment, the test selection system 105 uses the regression test case value and the test case weight to determine the regression test case covers a scope of code changes in the product release.

In an example embodiment, the test selection system 105 determines a test case weight, where the test case weight comprises at least one of a duration associated with the execution of the regression test case on a previous product release, at least one hardware requirement associated with the regression test case, and a number of times the regression test case was executed on the previous product release.

In an example embodiment, the test selection system 105 utilizes a dynamic programming method to select the regression test cases. In an example embodiment, the dynamic programming method simplifies this complicated problem by breaking it down into simpler sub-problems in a recursive manner. The final optimal subset of regression test cases can be obtained by recursively identifying optimal sub-subsets of the plurality of regression test cases.

Figure 3:
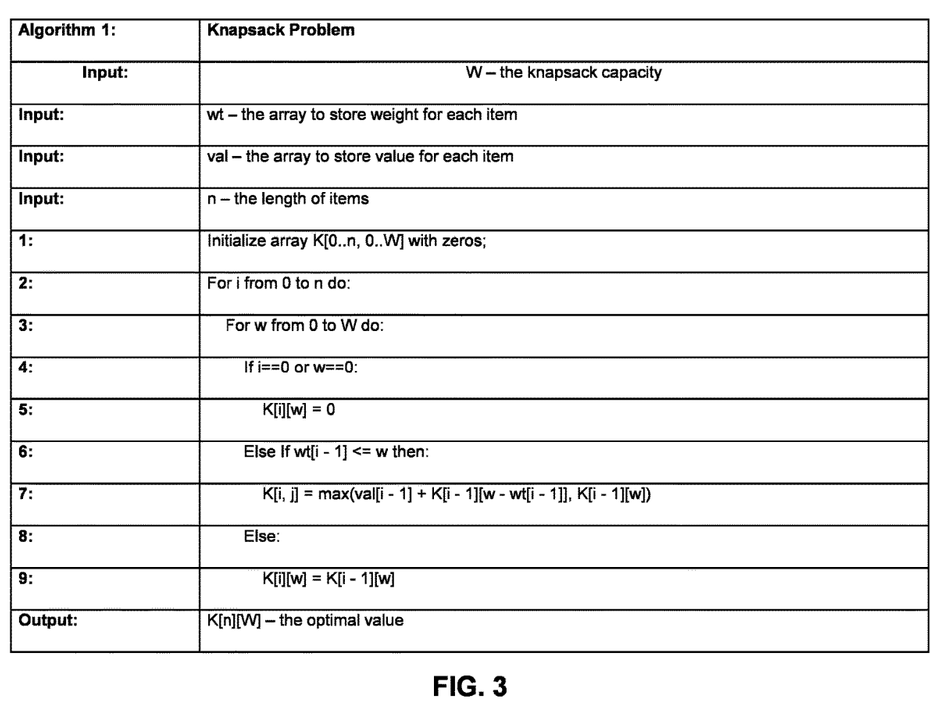
FIG. 3. illustrates the Knapsack Problem algorithm in an illustrative embodiment.

In an example embodiment, the test selection system 105 uses the regression test case value and the test case weight to determine which subset of regression test cases from the plurality of regression test cases. In an example embodiment, a first algorithm, such as the 0-1 knapsack problem algorithm as illustrated in FIG. 3 may be used. In an example embodiment, a second algorithm may be employed using the results of the first algorithm. The second algorithm may be, for example, the Trackback algorithm as illustrated in FIG. 4.

At 208, the software testing life cycle system 101 executes the regression test case on a system. In an example embodiment, the test selection system 105 repeats the steps of determining the product release weight, obtaining the regression test case value, and selecting the regression test case for the next product release using regression test case values from at least the product release and the previous product release. Thus, each subsequent product release uses the regression test case values from previous product releases.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

Figure 4:
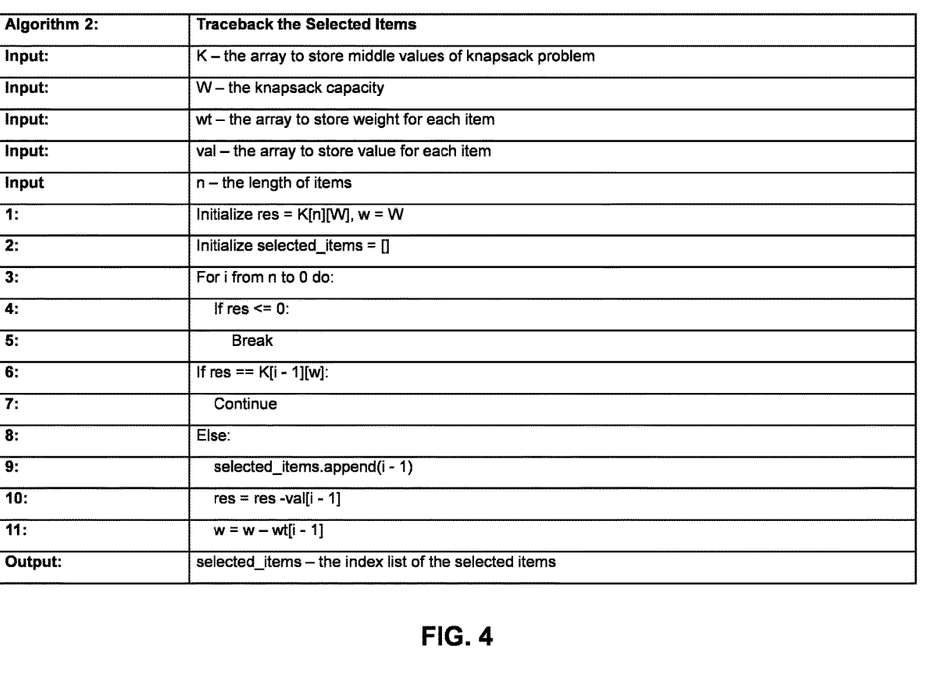
FIG. 4. illustrates the Traceback the Selected Items algorithm in an illustrative embodiment.

FIGS. 3 and 4 illustrate example algorithms used during the dynamic programming step to select the regression test case from the plurality of regression test cases.

The above-described illustrative embodiments provide significant advantages relative to conventional approaches. For example, some embodiments are configured to significantly improve identification of an optimal subset of regression test cases for each product release where the subset of regression test cases is targeted based on the code changes (i.e., new features and defects addressed). These and other embodiments can effectively improve regression testing for each product release relative to conventional approaches. For example, embodiments disclosed herein provide a way to evaluate the value and weight of regression test cases. Embodiments disclosed herein provide a way to select the best regression test cases to adequately provide regression testing coverage of the new features in the new product releases. Embodiments disclosed herein provide a way to establish a regression test case's value based on the issues the regression test case identifies, and update that value with each product release. Embodiments disclosed herein provide a system that is easily scaled with regard to regression test cases and product releases.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of the information processing system 100, these platforms may also be used to implement at least portions of other information processing systems in other embodiments.

Figure 5:
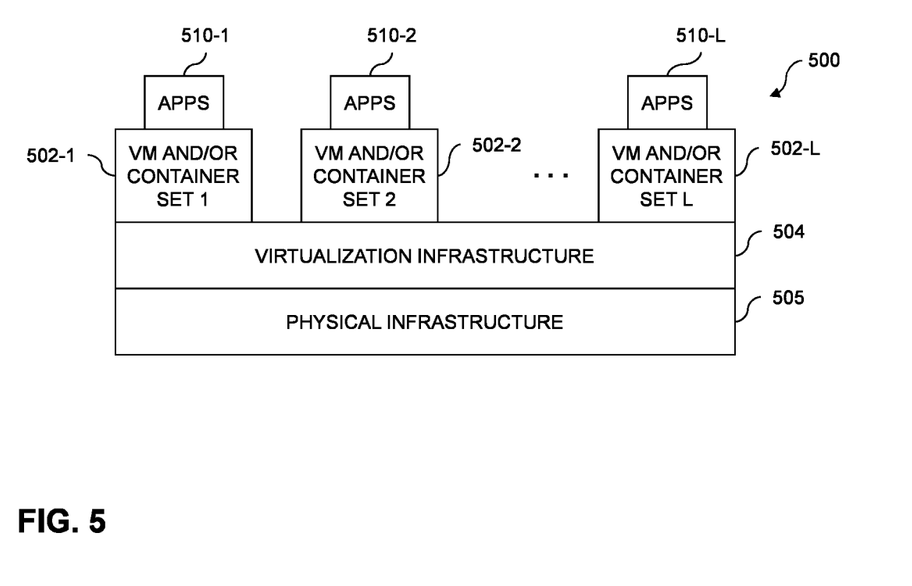
FIGS. 5 and 6 show examples of processing platforms that may be utilized to implement at least a portion of a test selection system embodiments.
Figure 6:
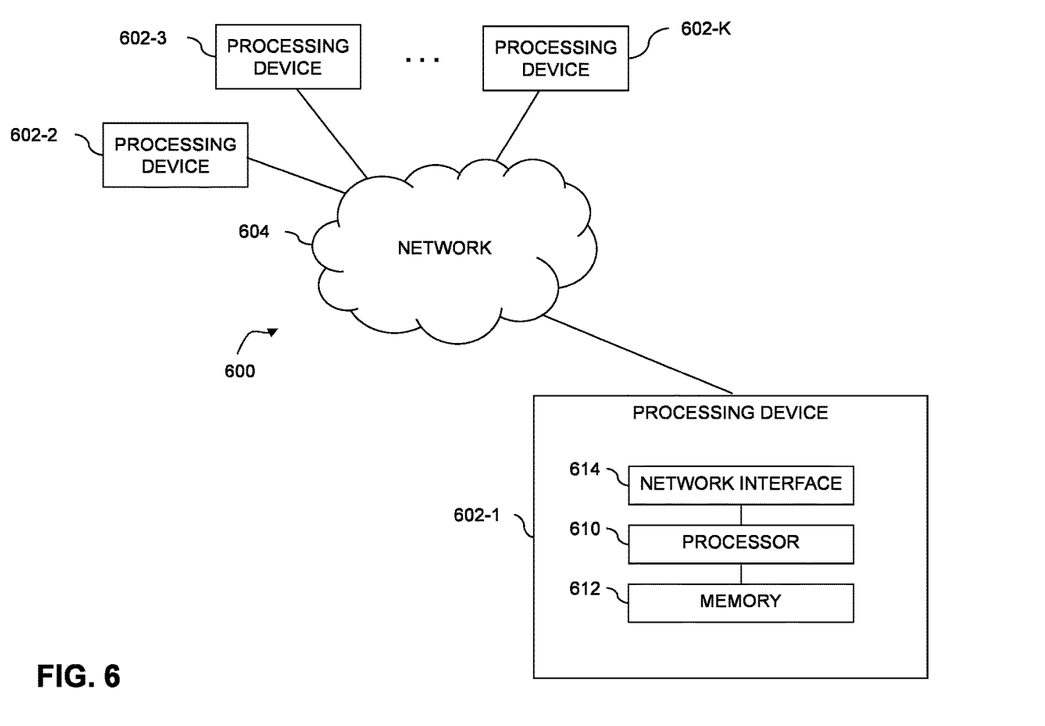

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 300 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, where the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of the information processing system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    selecting, by a test selection system, a regression test case from a plurality of regression test cases in a software testing lifecycle system, wherein each of the plurality of regression test cases is tagged in a matrix with one or more major areas based on a purpose associated with the each of the plurality of regression test cases;
    determining, by the test selection system, a product release weight associated with the regression test case, wherein the product release weight incorporates new features associated with a product release, wherein the product release weight is determined by establishing a code change impact between the product release and a previous product release, wherein the code change impact is established by:
        determining a new feature size and business ranking for each new feature in the product release;
        determining a default new feature weight using the business ranking;
        defining at least one primary major area and at least one secondary major area associated with a new feature for each new feature in the product release;
        calculating a new feature primary weight using the default new feature weight, for the at least one primary major area; and
        updating the matrix by assigning the default new feature weight to the at least one secondary major area;
    obtaining, by the test selection system, a regression test case value for the regression test case by applying the product release weight;
    selecting, by the test selection system, the regression test case for use in regression testing for the product release, based on the regression test case value;

executing the regression test case on a system; and updating the matrix with the regression test case value to obtain a new regression test case value for a next product release, wherein the method is implemented by at least one processing device comprising a processor coupled to a memory.

2. The method of claim 1 further comprising:

determining a respective regression test case value for each regression test case in the plurality of regression test cases; and selecting a subset of the plurality of regression test cases for use in regression testing for the product release, wherein the subset covers regression testing for at least a portion of code changes in the product release.

3. The method of claim 1 further comprising:

repeating the steps of determining the product release weight, obtaining the regression test case value, and selecting the regression test case for the next product release using regression test case values from at least the product release and the previous product release.

4. The method of claim 1 wherein determining by a test selection system, a product release weight associated with the regression test case comprises:

determining a major area score.

5. The method of claim 4 wherein determining the major area score comprises:

identifying major areas associated with a product;

identifying major areas test coverage of the regression test case;

assigning a base score to each major area tested by the regression test case; and updating the base score of the each major area based on results of the regression test case executing on a previous product release.

6. The method of claim 5 wherein updating the base score of the each major area comprises:

determining the regression test case identified defects during execution of the regression test on the previous product release; and updating the base score of the each major area based on a prior release defect major area weight associated with the defects identified during the execution on the previous product release.

7. The method of claim 1 wherein determining the code change impact comprises:

determining a new feature weight using a default new feature weight and a new feature primary weight.

8. The method of claim 1 wherein calculating the new feature primary weight comprises:

calculating the new feature primary weight using the default new feature weight and the new feature size.

9. The method of claim 1 wherein determining the default new feature weight using the business ranking comprises:

averaging a plurality of business rankings associated with all new features in the product release to determine the default new feature weight.

10. The method of claim 1 wherein determining a default new feature weight using the business ranking comprises:

for each major area impacted by the product release:

summing a plurality of new feature primary weights for a plurality of new features to obtain a major area weight for one major area.

11. The method of claim 1 wherein determining the code change impact comprises:

identifying a defect major area weight for each defect addressed in the product release.

12. The method of claim 11 wherein identifying the defect major area weight for each defect comprises:

determining the defect major area weight using at least one of:

i) A defect priority;

ii) A uniqueness of the defect; and iii) A defect status of whether the defect is a regression issue or deferral issue.

13. The method of claim 1 wherein determining, by the test selection system, the product release weight associated with the regression test case comprises:

combining a new feature weight and a defect major area weight for each defect to obtain the product release weight associated with the regression test case.

14. The method of claim 1 wherein selecting, by the test selection system, the regression test case for use in regression testing for the product release comprises:

using the regression test case value and the test case weight to determine the regression test case covers a scope of code changes in the product release.

15. The method of claim 1 wherein selecting, by the test selection system, the regression test case for use in regression testing for the product release, based on the regression test case value comprises:

determining a test case weight, wherein the test case weight comprises at least one of:

a duration associated with the execution of the regression test case on a previous product release;

at least one hardware requirement associated with the regression test case; and a number of times the regression test case was executed on the previous product release.

16. A system comprising:

at least one processing device comprising a processor coupled to a memory;

the at least one processing device being configured:

to select, by a test selection system, a regression test case from a plurality of regression test cases in a software testing lifecycle system, wherein each of the plurality of regression test cases is tagged in a matrix with one or more major areas based on a purpose associated with the each of the plurality of regression test cases;

to determine, by the test selection system, a product release weight associated with the regression test case, wherein the product release weight incorporates new features associated with a product release, wherein the product release weight is determined by establishing a code change impact between the product release and a previous product release, wherein the code change impact is established by:

determining a new feature size and business ranking for each new feature in the product release;

determining a default new feature weight using the business ranking;

defining at least one primary major area and at least one secondary major area associated with a new feature for each new feature in the product release;

calculating a new feature primary weight using the default new feature weight, for the at least one primary major area; and updating the matrix by assigning the default new feature weight to the at least one secondary major area;

to obtain, by the test selection system, a regression test case value for the regression test case by applying the product release weight;

to select, by the test selection system, the regression test case for use in regression testing for the product release, based on the regression test case value;

to execute the regression test case on a system; and to update the matrix with the regression test case value to obtain a new regression test case value for a next product release.

17. A computer program product comprising a non-transitory processor-readable storage medium having stored therein program code of one or more software programs, wherein the program code when executed by at least one processing device causes said at least one processing device:

to select, by a test selection system, a regression test case from a plurality of regression test cases in a software testing lifecycle system, wherein each of the plurality of regression test cases is tagged in a matrix with one or more major areas based on a purpose associated with the each of the plurality of regression test cases;

to determine, by the test selection system, a product release weight associated with the regression test case, wherein the product release weight incorporates new features associated with a product release, wherein the product release weight is determined by establishing a code change impact between the product release and a previous product release, wherein the code change impact is established by:

determining a new feature size and business ranking for each new feature in the product release;

determining a default new feature weight using the business ranking;

defining at least one primary major area and at least one secondary major area associated with a new feature for each new feature in the product release;

calculating a new feature primary weight using the default new feature weight, for the at least one primary major area; and updating the matrix by assigning the default new feature weight to the at least one secondary major area;

to obtain, by the test selection system, a regression test case value for the regression test case by applying the product release weight;

to select, by the test selection system, the regression test case for use in regression testing for the product release, based on the regression test case value;

to execute the regression test case on a system; and to update the matrix with the regression test case value to obtain a new regression test case value for a next product release.

* * * * *